United States Patent

Kawazawa et al.

[11] Patent Number: 5,978,122
[45] Date of Patent: Nov. 2, 1999

[54] NOISE SUPPRESSION METHOD FOR WAVELENGTH DIVISION MULTIPLEXING TRANSMISSION SYSTEM

[75] Inventors: Toshio Kawazawa, Tokyo; Koji Goto, Urawa; Tomohiro Otani, Hodogaya-ku; Haruo Abe, Tokyo; Masando Tanaka, Kawaguchi, all of Japan

[73] Assignee: Kokusai Denshin Denwa Kabushiki Kaisha, Tokyo, Japan

[21] Appl. No.: 08/672,071

[22] Filed: Jun. 26, 1996

[30] Foreign Application Priority Data

Jun. 26, 1995 [JP] Japan .................................. 7-180565

[51] Int. Cl.[6] .................................................. H04B 10/16
[52] U.S. Cl. .............................................. 359/179; 359/124
[58] Field of Search ...................................... 359/179, 124, 359/125, 161, 173, 181; 385/122

[56] References Cited

U.S. PATENT DOCUMENTS

| | | |
|---|---|---|
| 5,430,568 | 7/1995 | Little et al. .............................. 359/124 |
| 5,668,658 | 9/1997 | Hamada ................................... 359/179 |
| 5,675,428 | 10/1997 | Henmi ..................................... 359/179 |
| 5,677,781 | 10/1997 | Mori et al. ............................... 359/179 |
| 5,696,614 | 12/1997 | Ishikawa et al. ........................ 359/124 |
| 5,726,784 | 3/1998 | Alexander et al. ...................... 359/179 |

*Primary Examiner*—Jeffery A. Hofsass
*Assistant Examiner*—John Tweel, Jr.
*Attorney, Agent, or Firm*—Pollock, Vande Sande & Amernick

[57] ABSTRACT

A method of suppressing noise and improving the optical transmission characteristic of a wavelength division multiplexing transmission system provides lights for suppressing noise from the light sources (NS1 and NS2) which are multiplexed on the wavelength division multiplexed signal. Consequently, the S/N ratio of each channel of a wavelength division multiplexed signal which propagates through the optical path can be improved.

3 Claims, 7 Drawing Sheets

FIG. 1

ONE NOISE SUPPRESSION LIGHT and TWO OPTICAL SIGNALS of WAVELENGTH DIVISION MULTIPLEXING TRANSMISSION SYSTEM (BEFORE TRANSMISSION)

FIG.2

ONE NOISE SUPPRESSION LIGHT and TWO OPTICAL SIGNALS of WAVELENGTH DIVISION MULTIPLEXING TRANSMISSION SYSTEM (AFTER TRANSMISSION)

FIG.3

TWO NOISE SUPPRESSION LIGHTS and TWO OPTICAL
SIGNALS of WAVELENGTH DIVISION MULTIPLEXING
TRANSMISSION SYSTEM (BEFORE TRANSMISSION)

FIG.4

TWO NOISE SUPPRESSION LIGHTS and TWO OPTICAL
SIGNALS of WAVELENGTH DIVISION MULTIPLEXING
TRANSMISSION SYSTEM (AFTER TRANSMISSION)

| SUPPRESSION LIGHT | S/N [dB] | | BER | |
|---|---|---|---|---|
| | CH1 1558.4nm | CH2 1559.3nm | CH1 1558.4nm | CH2 1559.3nm |
| NO WAVE | 9.9 | 3.8 | $2.6 \times 10^{-7}$ | $5.3 \times 10^{-4}$ |
| ONE WAVE | 14.9 | 9.5 | $7.7 \times 10^{-9}$ | $1.7 \times 10^{-7}$ |
| TWO WAVES | 14.9 | 11.3 | $1.2 \times 10^{-10}$ | $8.0 \times 10^{-8}$ |

FIG.7

FIG.8(a)
OPTICAL AMPLIFIER REPEATER SYSTEM
PRIOR ART

FIG.8 (b)

PRIOR ART

TWO OPTICAL SIGNALS of WAVELENGTH DIVISION
MULTIPLEXING TRANSMISSION SYSTEM
(BEFORE TRANSMISSION)

PRIOR ART

FIG. 9

TWO OPTICAL SIGNALS of WAVELENGTH DIVISION
MULTIPLEXING TRANSMISSION SYSTEM
(AFTER TRANSMISSION)

PRIOR ART

FIG. 10

NOISE SUPPRESSION METHOD FOR WAVELENGTH DIVISION MULTIPLEXING TRANSMISSION SYSTEM

BACKGROUND OF THE INVENTION

1. Field of the Invention

The present invention relates to a noise suppression method for a wavelength division multiplexing transmission system with repeaters which have multistage optical amplifiers.

2. Related Background Art

In an optical communication system used for long distance communication on an optical fiber path trunk line system, it is common to use optical amplifiers located at a regular interval on an optical path in order to compensate for deterioration of the signal level, consequently the deterioration of the signal level is reduced.

In the past, an optical amplifier transmission system having multistage optical amplifiers using a single wavelength is known. In the single wavelength transmission of this kind, based on the characteristics of the length of the transmission system, the repeater and the optical fiber of the transmission system, an optimum design can be accomplished and an optimum transmission condition can be obtained.

Recently, the wavelength division multiplexing transmission system has been developed to increase the capacity of the system by using a plurality of wavelengths. In such a plural wavelength division multiplexing transmission system, it is necessary to design a system based on a different design concept from that of the single wavelength transmission system.

Figure 8A:
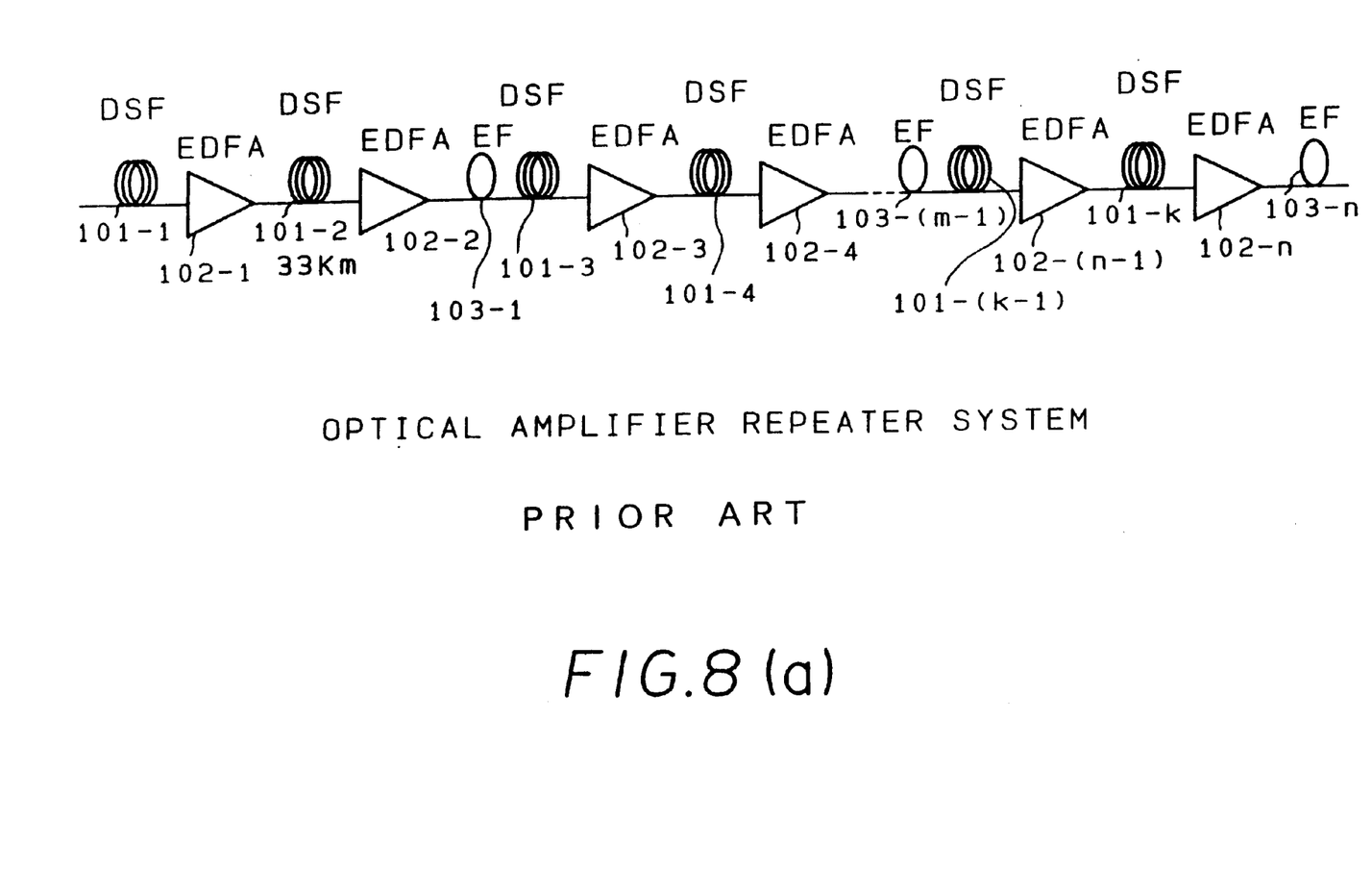
FIG. 8(a) shows a conventional optical amplifier repeater system.

FIG. 8(a) shows an example of the configuration of the transmission path of a wavelength division multiplexing transmission system with repeaters which have multistage optical amplifiers. As shown in this figure, the dispersion shift optical fiber (DSF) 101-1, the erbium-doped fiber amplifier (EDFA) 102-1, the DSF 101-2, the EDFA 102-2, the cut-off shift fiber (EF) 103-1, . . . are serially connected in the transmission path.

The dispersion shift optical fibers (DSF) 101-1~101-k constitute most of the transmission path. The erbium-doped fiber amplifiers (EDFA) 102-1~102-n are optical amplifiers which compensate the signal power. The cut-off shift fibers (EF) 103-1~103-m whose zero dispersion wavelength is 1.3 $\mu$m compensate for accumulated chromatic dispersion shift fibers (DSF) 101-1~101-k whose zero wavelength dispersion is 1.55 $\mu$m.

Wavelength dispersion is a phenomenon based on the fact that refractive index varies for the different signal wavelengths even in a homogeneous medium, and therefore propagation velocity varies with wavelength. For instance, if wavelength dispersion occurs in an optical fiber in which a pulse-like optical signal propagates, the pulse shape begins to deteriorate, the signal spectrum broadens as the signal propagates through the optical fiber, and consequently intersymbol interference may occur.

In order to prevent this phenomenon, the cut-off shift fibers (EF) 103-1~103-m are inserted as equalization fibers at predetermined intervals. The chromatic dispersion values of these EF-103-1~103-m are made to have an opposite sign to that of the chromatic dispersion values of the DSF 101-1~101-k.

Figure 8B:
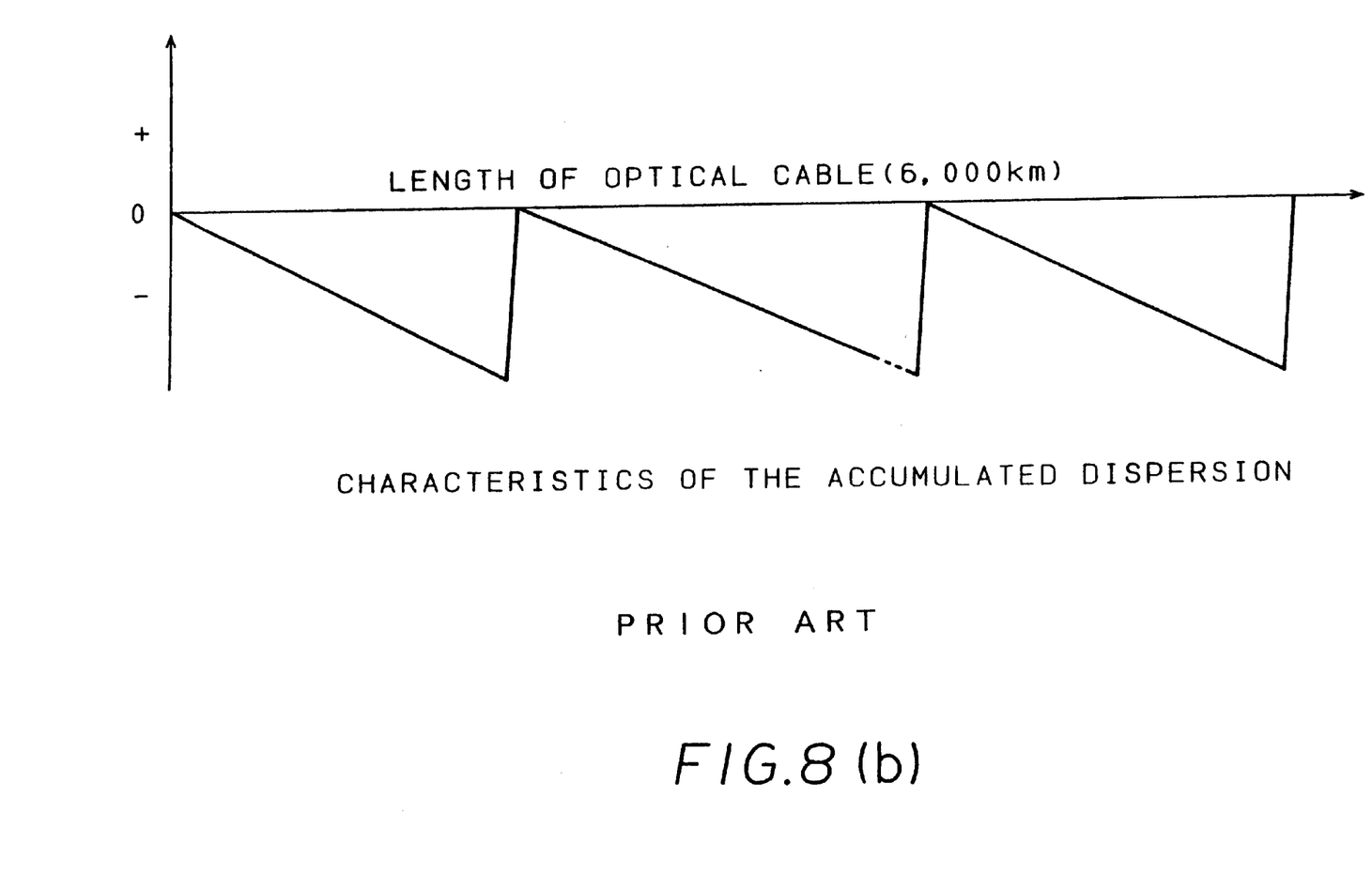
FIG. 8(b) shows characteristics of the accumulated dispersion in the system of FIG. 8(a).

FIG. 8(b) shows that the accumulated chromatic dispersion value gradually decreases in a negative direction, as the optical signal propagates through DSF 101-1, 101-2, . . . . When the optical signal propagates through the EF 103-1 portions of the path whose chromatic dispersion values have an opposite sign, the accumulated chromatic dispersion value reaches zero whereby the chromatic dispersion characteristic is compensated. Therefore the accumulated chromatic dispersion characteristics of the transmission path shown in FIG. 8(a) appears periodically. More specifically this accumulated chromatic dispersion characteristic occurs in an optical fiber transmission system comprising 184 optical amplifier repeaters in a 6,000 km long-haul optical submarine cable in which the optical repeater span is about 33 km, the output of each repeater is +3 dBm, and the gain of each repeater is 7 dB.

A peculiar problem on the FIG. 8(a) wavelength division multiplexing transmission system is the mutual interference (cross talk) between the signal wavelengths, because this wavelength division multiplexing transmission system has a plurality of signal wavelengths; this mutual interference deteriorates the transmission characteristics. More particularly, four-wave mixing occurred in the optical fiber causing an increase in noise which deteriorates the performance of the transmission system.

These various kinds of noise cause increasing problems as the transmission distance becomes longer, and the prior optical transmission system is unable to achieve a good transmission condition because of the influence of various kinds of noises which accumulate on the path of transmission.

This degree of interference is affected by almost all design parameters such as the distance between the wavelengths, the dispersion characteristics of the optical fiber, the non-linear optical characteristics, the characteristics of the output of the optical amplifier repeater, the system length and so on. Therefore in order to optimize the transmission characteristics of a wavelength division multiplexing transmission system, it is necessary to adjust or modify these factors (parameters).

It is especially necessary, when replacing a single wavelength transmission system with a wavelength division multiplexing transmission system, to readjust or to change the parameters mentioned above in order to improve the transmission performance.

Figure 9:
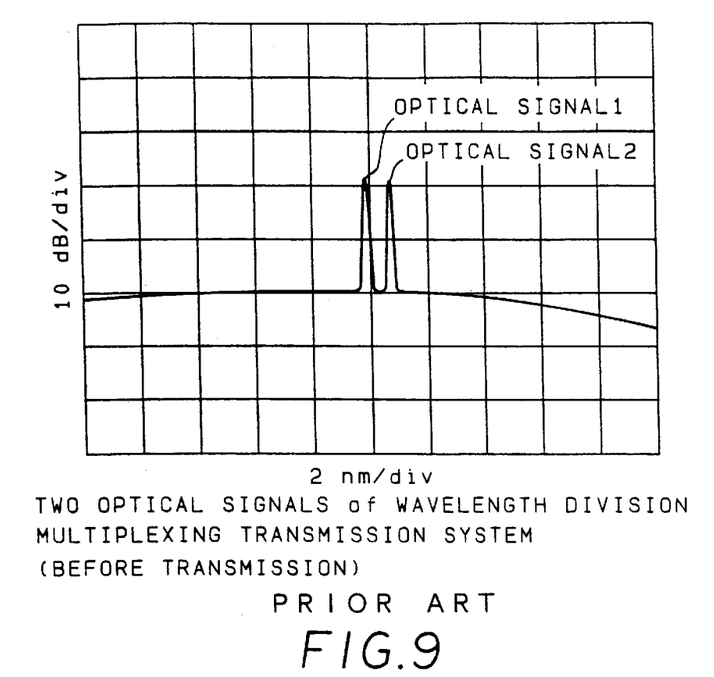
FIG. 9 shows an optical spectrum of the prior optical multiplexed signal before the transmission in the conventional system.
Figure 10:
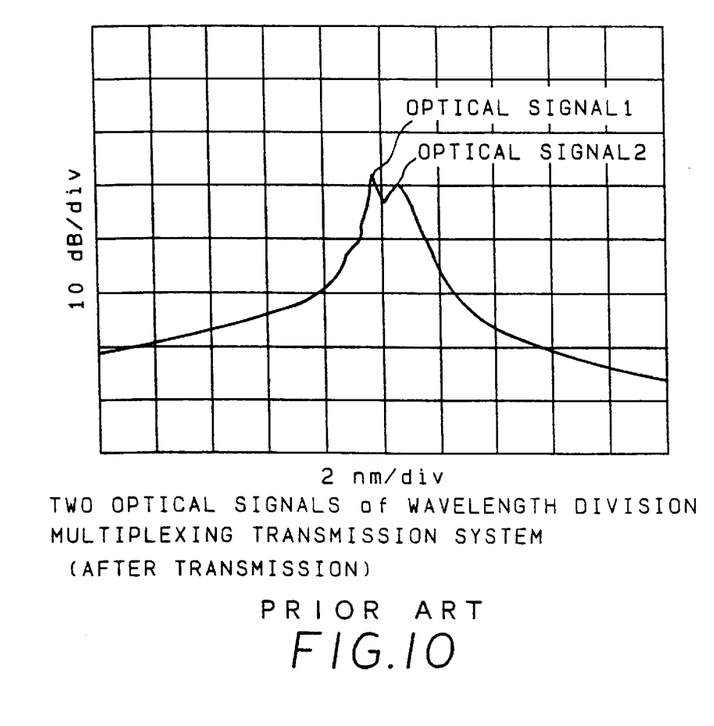
FIG. 10 shows an optical spectrum of the prior optical multiplexed signal after the transmission in the conventional system.

For instance, FIG. 9 shows the spectrum of two original signals of a conventional wavelength division multiplexing transmission system, and FIG. 10 shows the spectrum of the transmitted signals. As shown in FIG. 9, the optical signal 1 and optical signal 2 which have different wavelengths are multiplexed, this wavelength division multiplexed signal propagates through the optical path, and the spectrum at the receiving side becomes the one shown in FIG. 10 because of the reasons mentioned above.

Figure 7:
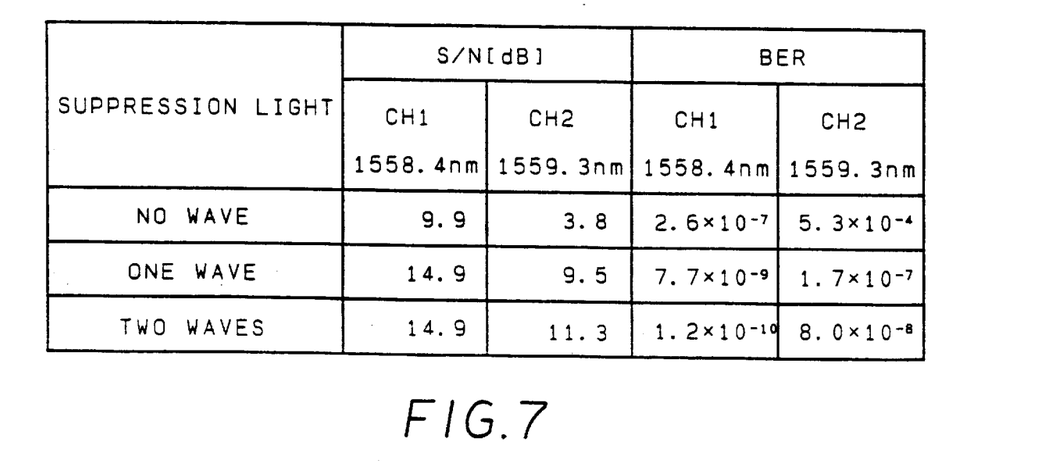
FIG. 7 is a table of the transmission characteristics of the present invention and the prior art.

As shown in FIG. 10, noises spread the spectra of the optical signal 1 and optical signal 2, consequently the signal-to-noise ratio (S/N) after the transmission is, as shown in the table of FIG. 7, 9.9 dB for the optical signal 1 (CH1) and 3.8 dB for optical signal 2 (CH2) which is a deteriorated S/N. And a Bit Error Rate (BER), as shown in the table of FIG. 7, is $2.6\times10^{-7}$ for the optical signal 1 (CH1) and $5.3\times10^{-4}$ for the optical signal 2 (CH2) which is a rather greater Bit Error Rate.

The wavelength division multiplexing transmission system uses a plurality of wavelengths which are different from that of the optical signal designed for the single wavelength transmission, so that the transmission performance is deteriorated as mentioned above. Consequently the parameters must be changed to meet desired optical transmission conditions.

Specifically in an optical amplified repeater transmission system placed on the bottom of the sea, which has multistage optical amplifiers, the transmission band width of submarine facilities is limited, and the wavelength spacing between the optical signals are designed in accordance with the degree of the multiplexity of the optical waves.

But it is physically and economically difficult to readjust system components caused by changing a transmission system. For instance in a submarine cable system which has already been installed, there is a possibility that adjustment of the characteristics of the amplifiers and replacement of erbium-doped fibers etc. and optical fibers may be necessary, so it becomes necessary to recover the optical amplified repeaters and to effect replacement of new optical fiber submarine cables. This is as difficult or more difficult than replacing the existing system with a new submarine cable system.

SUMMARY OF THE INVENTION

Thus in the present invention, it is intended to provide a method of suppressing noise in a wavelength division multiplexing transmission system, which can suppress noise without readjusting the gain or output of optical repeaters, or characteristics of an optical fiber, or the spacing between wavelengths of the optical signal and so on.

In order to attain this object, according to the present invention there is provided a noise suppression method for a wavelength division multiplexing transmission system having a plurality of channels to which a plurality of different wavelengths are assigned respectively, wherein at least one light, whose wavelength is different from said wavelengths of said plurality of channels, is transmitted to suppress noise being multiplexed on said plurality of channels.

Said light for suppressing noise is an unmodulated light or a modulated light of a sufficiently lower frequency than the modulation frequencies of said optical signal.

According to the present invention, by multiplexing at least one wavelength of a light for suppressing noise on an optical signal and transmitting it, the noise is greatly reduced and the S/N ratio of each channel can be improved.

The reason for this improvement might be as follows. When the signal power is higher than some level, most of the noise is caused by nonlinearity. The nonlinearity noise increases as a result of four-wave mixing, self phase modulation, crossphase modulation, stimulated Burillouin scattering, remanscattering, and so on. When a light source (noise suppressing light source) which is different from the transmission signal is mixed with the signal light source, the optical power level of a transmission signal per channel is decreased. Therefore, the decreasing signal power per channel makes it possible to reduce nonlinearity noise power.

EXPLANATION OF THE REFERENCE CHARACTERS 2 pulse-pattern generator
3-1, 3-2, 12-1, 12-2 optical attenuator
4 device for mixing optical waves (optical coupler)
5-1~5-k dispersion shift fiber
6-1~6-n erbium-doped fiber amplifier
7-1~7-m equalization fiber (cut-off shift fiber)
8-1, 8-2 optical band-pass filter
9-1, 9-2 optical receiver
10-1, 10-2 error detector
11 device for separating optical waves
13 optical spectrum analyzer
OS1, OS2 optical transmitter
NS1, NS2 light source of a light for suppressing noise

DETAILED DESCRIPTION OF THE INVENTION

Figure 1:
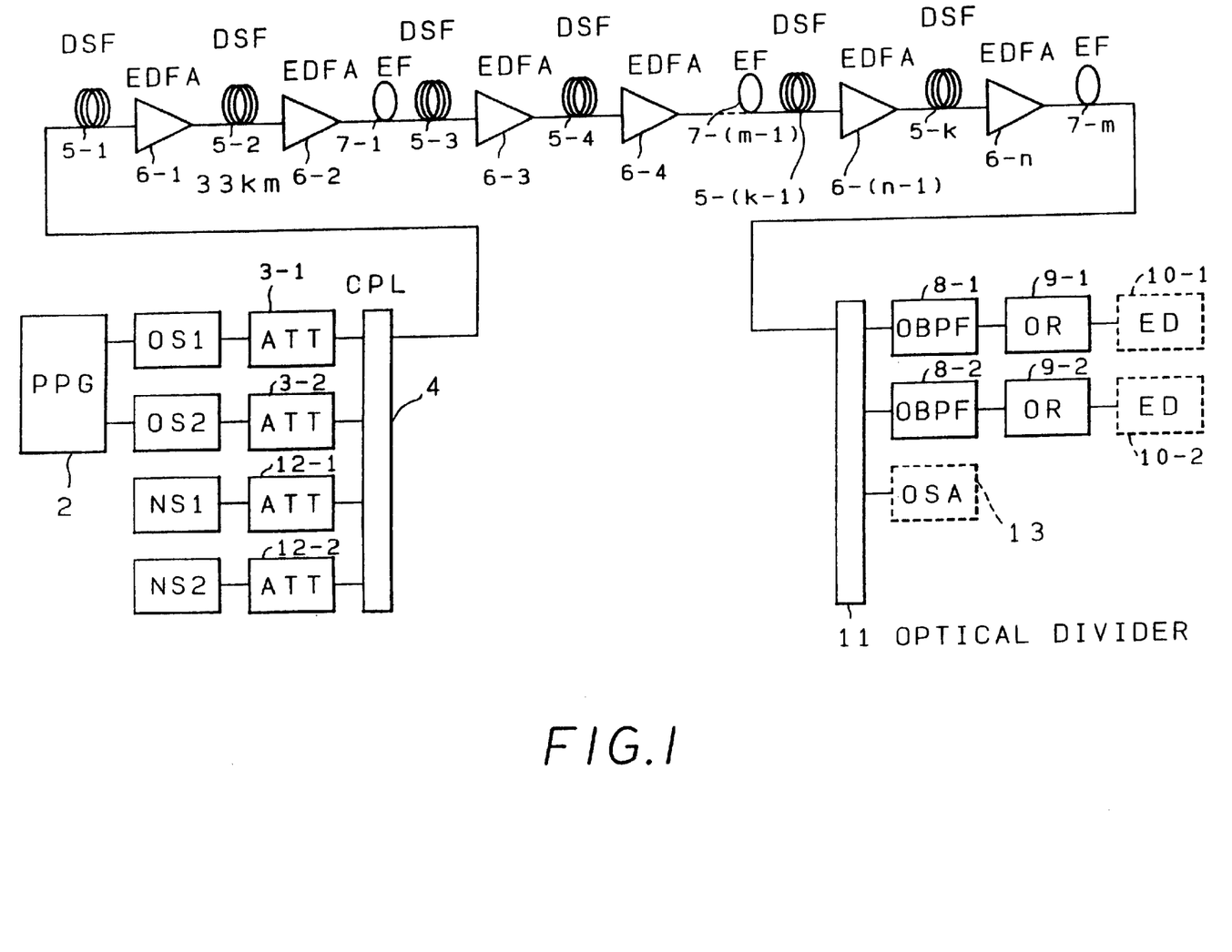
FIG. 1 shows an example of a configuration of an optical amplified repeater transmission system having multistage amplifiers which utilizes a noise suppression method for wavelength division multiplexing transmission system of the present invention.

FIG. 1 is an example of the configuration of an optical amplified repeater transmission system, having multistage optical amplifiers, which utilizes the noise suppression method of the present invention for a wavelength division multiplexing transmission system. However, FIG. 1 only shows the configuration for one direction of the transmission system.

The optical amplified repeater transmission system, shown in FIG. 1 has multistage optical amplifiers, and comprises optical-fiber cables and optical amplifying repeaters which are inserted between the optical-fiber cables at a predetermined interval. The optical amplifying repeaters are the erbium-doped fiber amplifiers (EDFA) 6-1~6-n, and as the optical fiber cables, the system uses dispersion shift fiber cables which have a zero dispersion wavelength of 1.5 $\mu$m (DSF) 5-1~5-k and cut-off shift fiber cables which have a zero dispersion wavelength of 1.3 $\mu$m (EF) 6-1~6-n compensating for the wavelength dispersion.

In this case, 184 optical amplifying repeaters are used, the length of the optical submarine cable is about 6,000 km, the interval between the optical amplifying repeaters is about 33 km, the output of the optical amplifying repeater is +3 dBm and the gain of the optical amplifying repeater is about 7 dB. The characteristics of the accumulated dispersion by combining DSF 5-1~5-k and EF 6-1~60-n are shown in FIG. 8(b).

At the transmitting side, a NRZ signal (Non-Return to Zero) of 5.3 G Bit/s generated by the pulse-pattern generator (PPG) 2 is inputted to a first optical transmitter OS1 so that a laser beam is modulated to generate an optical signal of a first channel (CH1). The NRZ signal (Non-Return to Zero) of 5.3 G Bit/s generated by the pulse-pattern generator (PPG) 2 is also inputted to a second optical transmitter OS2 so that a laser beam is modulated to generate an optical signal of the second channel (CH2). In this case, for instance, the wavelength of the first channel is designed to be 1,558.4 nm, and the wavelength of the second channel is designed to be 1,559.3 nm.

The optical signal of the first channel is supplied through an optical attenuator (ATT) 3-1 and the optical signal of the second channel is supplied through an optical attenuator (ATT) 3-2 to an optical coupler (CPL) 4. A light source NS1 generates unmodulated light of a wavelength of 1,560.7 nm for suppressing noise and a light source NS2 generates unmodulated light of a wavelength of 1,557.2 nm for suppressing noise, and these unmodulated lights are supplied through the optical attenuator (12-1) or the optical attenuator (12-2) to the CPL 4, so that four lights whose wavelengths are different from each other are input to and mixed at the CPL 4. The resultant optical wavelength division multiplexed signal is transmitted from the CPL 4 to the DSF 5-1.

The levels of the optical signal lights and the unmodulated lights for suppressing noise are adjusted respectively by using the optical attenuators (ATT) 3-1, 3-2, 12-1, 12-2 so that the input level of the first EDFA 6-1 may be a nominal value of −4 dBm.

In this way, the optical wavelength-multiplexed signal which is transmitted to the DSF 5-1 arrives at the receiving side through the DSF 5-1, the EDFA 6-1, the DSF 5-2, the EDFA 6-2, the EF 7-1, . . . , the DSF 5-k, the EDFA 6-n, the EF 7-m.

At the receiving side, the optical wavelength division multiplexed signal is branched by an optical wave separating device 11 for branching optical waves, and then inputted to an optical band-pass filter (OBPF) 8-1 which extracts the wavelength of the first channel, and to an optical band-pass filter (OBPF) 8-2 which extracts the wavelength of the second channel respectively. The optical signal of the first channel extracted at the OBPF 8-1 is received by the optical receiver (OR) 9-1 and the optical signal of the first channel is reproduced. The optical signal of the second channel extracted at the OBPF 8-2 is received by the optical receiver (OR) 9-2 and the optical signal of the second channel is reproduced.

Figure 2:
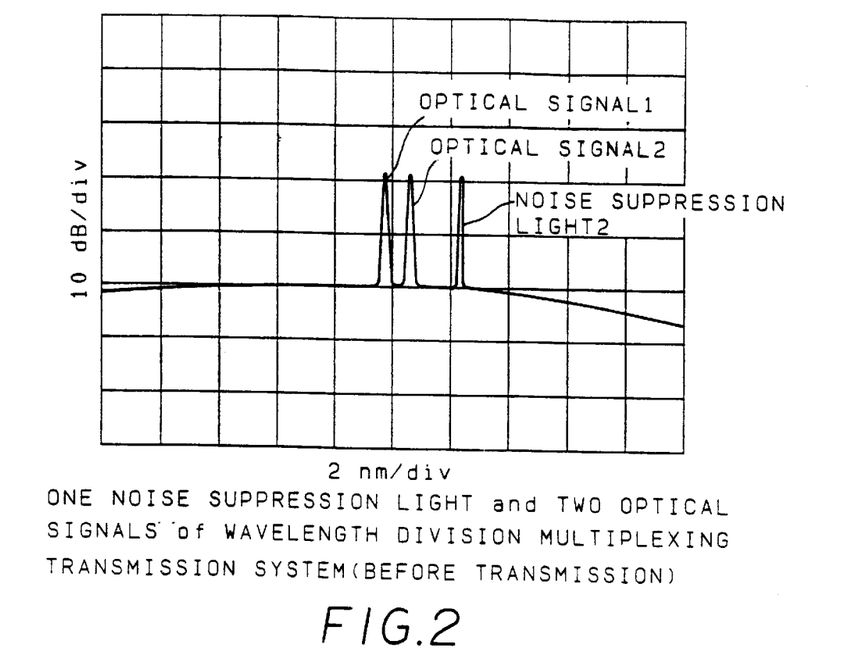
FIG. 2 shows an optical spectrum of the optical wavelength multiplexed signal before the transmission of a light for suppressing noise that consists of one wavelength.
Figure 3:
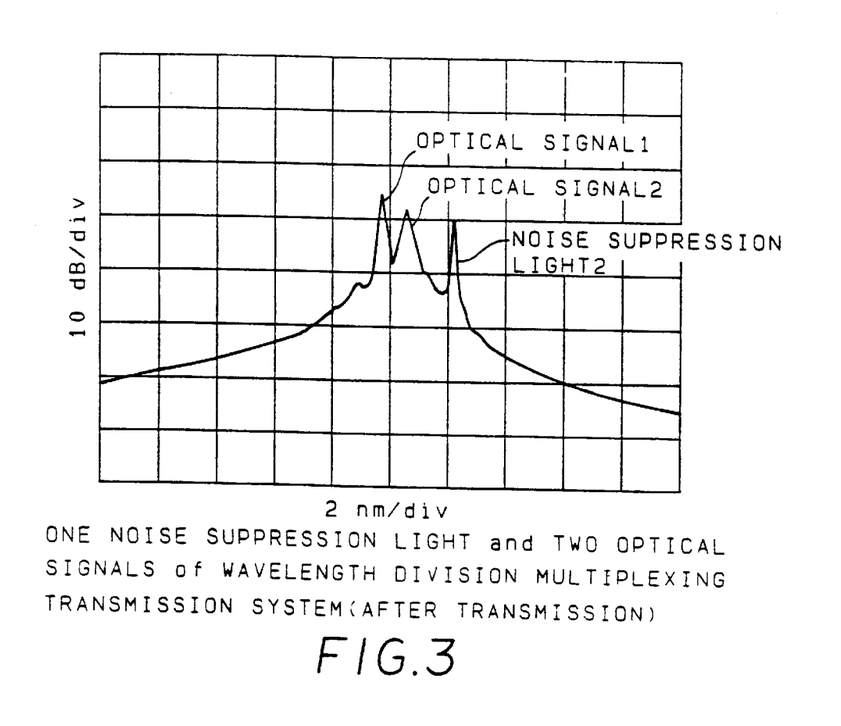
FIG. 3 shows an optical spectrum of the optical wavelength multiplexed signal after the transmission of a light for suppressing noise that consists of one wavelength.

In the transmission system constituted as mentioned above, the optical spectrum of the optical multiplexed signal which is transmitted from the CPL 4 of the transmitting side is shown in FIG. 2 and the optical spectrum of the optical multiplexed signal inputted to the wave separating device 11 of the receiving side is shown in FIG. 3 in the case where the light for suppressing noise consists of one wavelength of 1,560.7 nm. The spectrum of the receiving side is the one which is measured by the optical spectrum analyzer (OSA) 13, shown by broken line in FIG. 1, connected to the wave separating device 11 for branching optical waves.

In the optical spectrum of the transmitting side shown in FIG. 2, the first and second signal lights for suppressing noise are wavelength division multiplexed in a preferable S/N ratio. When this wavelength division multiplexed signal propagates through the transmission system having multi-stage optical amplifiers shown in FIG. 1, the optical spectrum is transformed as shown in FIG. 3 at the receiving side.

Figure 6:
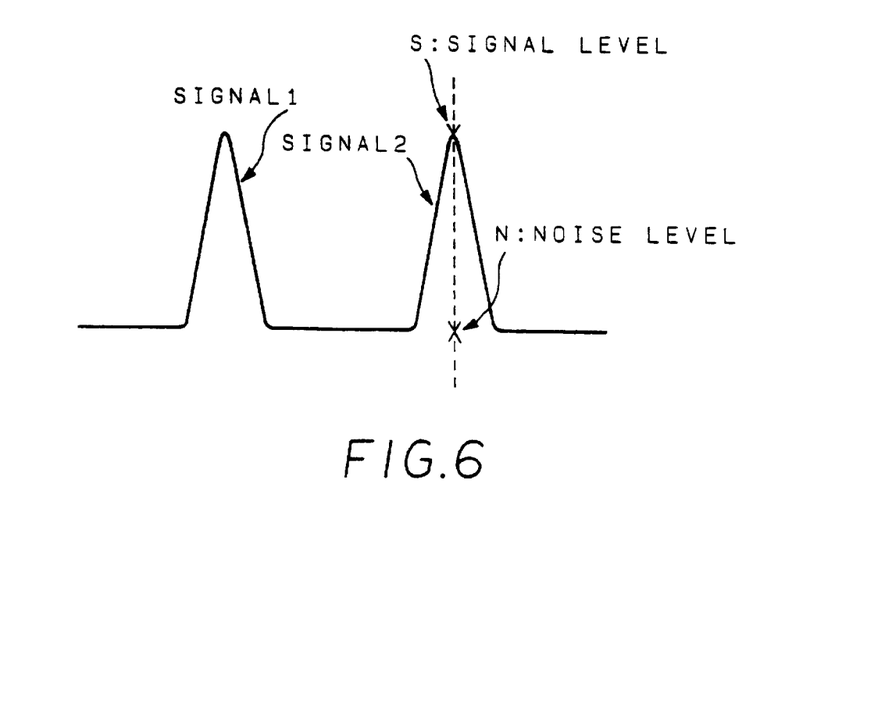
FIG. 6 shows a conception of the optical S/N ratio.

The optical S/N and BER (Bit Error Rate) of the case mentioned above are shown in FIG. 7. More specifically, in the optical S/N whose conceptional figure is shown in FIG. 6 the signal level (S) is defined as a peak value and the noise level (N) is defined as a background noise of the optical spectrum. The BER was measured, as shown in broken line in FIG. 1, by connecting error detectors (ED) 10-1, 10-2 to the optical receivers 9-1, 9-2 respectively.

With reference to FIG. 7, the optical S/N becomes 14.9 dB at the first channel (CH1) and 9.4 dB at the second channel (CH2), i.e., the S/N ratio was improved about 5 dB compared to the prior art. The BER becomes $7.7 \times 10^{-9}$ at the first channel (CH1) and $1.7 \times 10^{-7}$ at the second channel (CH2), i.e., the BER was improved greatly by a power of 100 or 1000 compared to the prior art.

The reason might be as follows. When the signal power is higher than some level, the greatest noise is caused by nonlinearity. The nonlinearity noise increases due to four wave mixing, self phase modulation, crossphase modulation, stimulated Burillouin scattering, remanscattering, and so on. When a light source (noise suppressing light source) whose wavelength is different from the transmission signal is mixed with the signal light source, then the optical power level of a transmission signal per channel is decreased. The decreasing signal power per channel makes it possible to reduce nonlinearity noise power.

Figure 4:
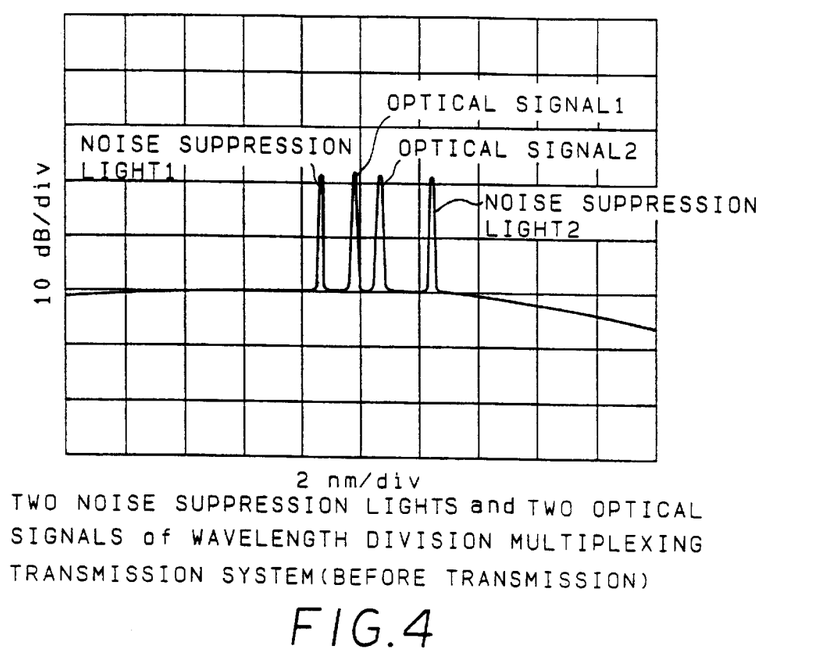
FIG. 4 shows an optical spectrum of the optical wavelength multiplexed signal before the transmission of two lights for suppressing noise consisting of two wavelengths.
Figure 5:
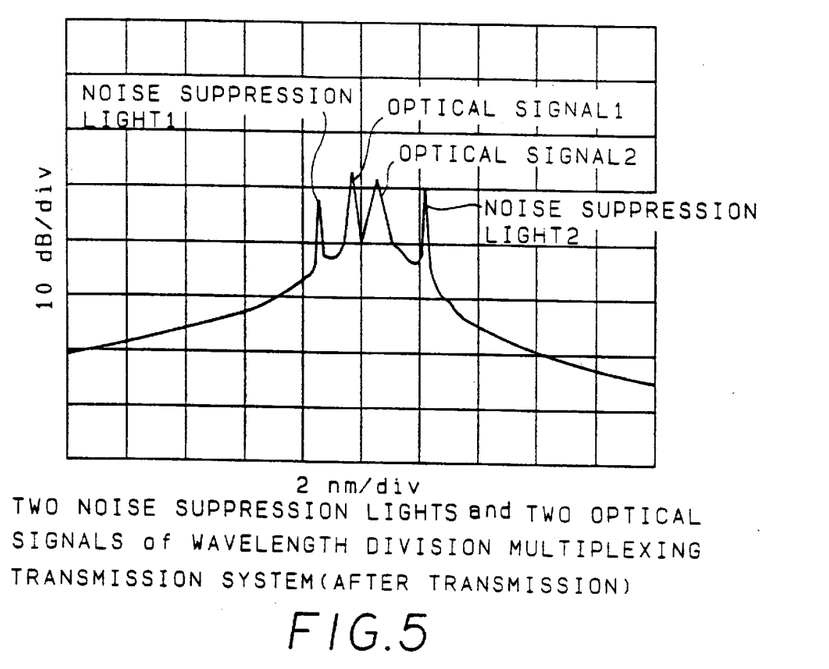
FIG. 5 shows an optical spectrum of the optical wavelength multiplexed signal after the transmission of two lights for suppressing noise consisting of two wavelengths.

In the method of suppressing noise of the present invention, the light for suppressing noise is not limited to one wavelength light, more specifically more than two wavelengths can be multiplexed for suppressing noise. For instance, when the noise suppressing light consists of two wavelengths having a wavelength of 1560.7 nm and a wavelength of 1557.2 nm, the optical spectrum of the optical multiplexed signal transmitted from the CPL 4 of the transmitting side is as shown in FIG. 4, and the optical spectrum of the optical multiplexed signal at the receiving side after the transmission has been inputted to the wave separating device 11 is as shown in FIG. 5. The spectrum of the receiving side was measured by the optical spectrum analyzer (OSA) 13, shown by broken line in FIG. 1.

In the optical spectrum at the transmitting side shown in FIG. 4, the optical signal 1 (CH1), the optical signal 2 (CH2), the light 1 for suppressing noise and the light 2 for suppressing noise are wavelength division multiplexed in a good S/N ratio. When this wavelength multiplexed light propagates through the transmission system having multi-stage optical amplifiers shown in FIG. 1, the optical spectrum is transformed as shown in FIG. 5 at the receiving side.

The optical S/N and BER of the two wave suppression light system are shown in FIG. 7. The optical S/N becomes 14.9 dB at the first channel (CH1) and 11.3 dB at the second channel (CH2), thus the S/N ratio of the second channel is improved. The BER becomes $1.2 \times 10^{-10}$ at the first channel (CH1) and $8.0 \times 10^{-8}$ at the second channel (CH2), thus the BER is improved in both channels.

Increasing the number of lights used for suppressing noise more effectively reduces the noise of the system and consequently the optical S/N and BER can be improved. However, the total optical power of the light inputted to the system is limited, since there is a limitation to the optical intensity that can be transmitted to an optical fiber. Consequently if the number of lights for suppressing noise is increased, then the power of the optical signal should be reduced but this would mean that the transmission characteristic of the optical signal cannot be improved. The number of lights for suppression noise is therefore limited.

In addition, the transmission characteristic of the optical signal cannot be improved if the wavelength of the light for suppressing noise is not within the wavelength amplification range of the optical amplifying repeater. And the wavelength of the light for suppressing noise must be one which can be separated from the wavelengths of the optical signals at the receiving side. In other words, the wavelength which is within the range of the wavelength where the optical amplifying repeater can amplify and which can be separated from that of the optical signals at the receiving side, should be carefully selected.

In the above embodiment, the light for suppressing noise is unmodulated; however even if the light for suppressing noise is modulated with a frequency lower enough than the modulation frequency of the optical signals, the transmission characteristic can be improved.

An improvement was also achieved when the noise suppression lights modulation frequency was changed to 280 M Bit/s with 5.3 G bit/s optical signal frequency.

The noise suppression light modulation frequency was intensity modulation in the above embodiment, but efficient noise suppression is possible with any formatted modulation, such as phase modulation, frequency modulation, and intensity modulation.

As the present invention is constituted hereinbefore, evaluating the transmission characteristic of a repeated transmission system which has multistage optical amplifiers confirms that the optical S/N can be improved more than 5 dB compared to the prior art and the BER can be improved by a power of 100 to 10,000 compared to the prior art.

Therefore, the transmission characteristic of the wavelength division multiplexing transmission system can be significantly improved over the prior art.

What is claimed is:

1. A noise suppression method for a wavelength division multiplexing transmission system, comprising the steps of:
    providing optical signals at different wavelengths,
    providing a first noise suppression light at a wavelength that is different from the wavelengths of the optical signals, the first noise suppression light being unmodulated light or light modulated at a lower frequency than modulated frequencies of the optical signals,
    providing a second noise suppression light at a wavelength that is different from the wavelength of the first noise suppression light and different from the wavelengths of the optical signals, the second noise suppression light being unmodulated light or light modulated at a lower frequency than modulation frequencies of the optical signals,
    coupling the optical signals and the first and second noise suppression lights into a wavelength division multiplexed signal, and
    transmitting the wavelength division multiplexed signal to an optical transmission line having optical amplifiers.

2. The noise suppression method according to claim 1, wherein the optical amplifiers are erbium-doped fiber amplifiers.

3. The noise suppression method according to claim 1, wherein the optical signals are modulated by a G Bit/s order modulation frequency, and both said first and second noise suppression lights are modulated at a frequency selected from 0 to 280 M Bit/s.

* * * * *